(12) United States Patent
Neal et al.

(10) Patent No.: US 11,529,893 B2
(45) Date of Patent: Dec. 20, 2022

(54) REVERSIBLE V SLEEPING SEAT

(71) Applicant: GM GLOBAL TECHNOLOGY OPERATIONS LLC, Detroit, MI (US)

(72) Inventors: Mark O. Neal, Rochester, MI (US); Louis D. Thole, Grosse Pointe Park, MI (US); David Acosta, Royal Oak, MI (US); Chin-Hsu Lin, Troy, MI (US); Yi-Pen Cheng, Troy, MI (US); Scott D. Thomas, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 700 days.

(21) Appl. No.: 16/514,267

(22) Filed: Jul. 17, 2019

(65) Prior Publication Data
US 2021/0016688 A1    Jan. 21, 2021

(51) Int. Cl.
| | | |
|---|---|---|
| *B60N 2/14* | (2006.01) | |
| *B60N 2/005* | (2006.01) | |
| *B60N 2/20* | (2006.01) | |
| *B60N 2/10* | (2006.01) | |
| *A47C 7/50* | (2006.01) | |
| *B60N 2/02* | (2006.01) | |

(52) U.S. Cl.
CPC ............ *B60N 2/143* (2013.01); *A47C 7/506* (2013.01); *B60N 2/005* (2013.01); *B60N 2/10* (2013.01); *B60N 2/20* (2013.01); *B60N 2002/022* (2013.01); *B60N 2002/0212* (2013.01)

(58) Field of Classification Search
CPC .......... B60N 2/0292; B60N 2/04; B60N 2/10; B60N 2/12; B60N 2/143; B60N 2/20; B60N 2/203
USPC ............................................ 296/65.09, 65.16
See application file for complete search history.

(56) References Cited

U.S. PATENT DOCUMENTS

| | | | | |
|---|---|---|---|---|
| 10,040,373 | B2* | 8/2018 | Rawlinson | ............... B60N 2/07 |
| 10,421,373 | B2* | 9/2019 | Line | ....................... B60N 2/146 |
| 2002/0109389 | A1* | 8/2002 | Satoh | ................... B60N 2/0292 |
| | | | | 297/423.19 |
| 2018/0105080 | A1* | 4/2018 | Dry | ........................ B60N 3/002 |
| 2019/0217748 | A1* | 7/2019 | Krnja | ..................... B60N 2/809 |
| 2020/0139851 | A1* | 5/2020 | Oshima | ..................... A47C 7/72 |
| 2020/0324674 | A1* | 10/2020 | Matsuzawa | .............. B60N 2/01 |
| 2020/0406789 | A1* | 12/2020 | Line | ....................... B60N 2/146 |

\* cited by examiner

*Primary Examiner* — Jason S Daniels
(74) *Attorney, Agent, or Firm* — Cantor Colburn LLP (57) ABSTRACT

An adjustable seat for a vehicle including a first seat section configured to support a lower leg portion of the passenger when the passenger is sitting facing the first direction and a second seat section configured to support an upper leg portion of the passenger when the passenger is sitting facing the first direction and a torso and head portion of the passenger when the passenger is sitting facing the second direction. The adjustable seat also comprising a third seat section configured to support the torso and head portion of the passenger when the passenger is sitting facing the first direction and the upper leg portion of the passenger when the passenger is sitting facing the second direction. The adjustable seat also comprising a fourth seat section configured to support the lower leg portion of the passenger when the passenger is sitting facing the second direction.

19 Claims, 9 Drawing Sheets

REVERSIBLE V SLEEPING SEAT

INTRODUCTION

The subject disclosure relates to vehicles, and more particularly relates to a vehicle seat.

In the near future, autonomous vehicles may be able to pick up passengers and deliver passengers to a destination without the input of a human driver. Autonomous vehicles may be capable of operating for extended periods of time without any input or oversight from a human driver.

SUMMARY

In an exemplary embodiment, an adjustable seat for a vehicle configured to allow a passenger to sit facing a first direction and facing a second direction is provided. The adjustable seat including a first seat section configured to support a lower leg portion of the passenger when the passenger is sitting facing the first direction and a second seat section configured to support an upper leg portion of the passenger when the passenger is sitting facing the first direction and a torso and head portion of the passenger when the passenger is sitting in the second direction. The adjustable seat also including a third seat section configured to support the torso and head portion of the passenger when the passenger is sitting facing the first direction and the upper leg portion of the passenger when the passenger is sitting in the second direction. The adjustable seat also including a fourth seat section configured to support the lower leg portion of the passenger when the passenger is sitting in the second direction.

In addition to one or more of the features described herein, or as an alternative, further embodiments may include that the second seat section further includes an outer surface and one or more bladders configured to inflate and adjust the outer surface to conform to the upper leg portion of the passenger when the passenger is sitting facing the first direction or to the torso and head portion of the passenger when the passenger is sitting in the second direction.

In addition to one or more of the features described herein, or as an alternative, further embodiments may include that the third seat section further includes an outer surface; and one or more bladders configured to inflate and adjust the outer surface to conform to the torso and head portion of the passenger when the passenger is sifting facing the first direction or to the upper leg portion of the passenger when the passenger is sitting in the second direction.

In addition to one or more of the features described herein, or as an alternative, further embodiments may include that the fourth seat section does not support the passenger when the passenger is sifting facing the first direction.

In addition to one or more of the features described herein, or as an alternative, further embodiments may include that the first seat section does not support the passenger when the passenger is sifting in the second direction.

In addition to one or more of the features described herein, or as an alternative, further embodiments may include a hinge operably connected to the first seat section, wherein the first seat section may be rotated relative to the second seat section through an angle as measured between the first seat section and the second seat section.

In addition to one or more of the features described herein, or as an alternative, further embodiments may include a hinge operably connected to the fourth seat section, wherein the fourth seat section may be rotated relative to the third seat section through an angle as measured between the fourth seat section and the third seat section.

In addition to one or more of the features described herein, or as an alternative, further embodiments may include a lower base plate and a first support structure operably connected to the second seat section and the lower base plate. The first support structure being configured to adjust a position of the second seat section. Further embodiment may also include a second support structure operably connected to the third seat section and the lower base plate. The second support structure being configured to adjust a position of the third seat section.

In addition to one or more of the features described herein, or as an alternative, further embodiments may include that the first support structure includes at least one of a first support arm and a first structural support, and wherein the at least one of the first support arm and the first structural support is configured to extend and retract to adjust the position of the second seat section.

In addition to one or more of the features described herein, or as an alternative, further embodiments may include that the second support structure includes at least one of a second support arm and a second structural support, wherein the at least one of the second support arm and the second structural support is configured to extend and retract to adjust the position of the third seat section.

In addition to one or more of the features described herein, or as an alternative, further embodiments may include that the first support structure and the second support structure are configured to adjust an angle between the second seat section and the third seat section.

In addition to one or more of the features described herein, or as an alternative, further embodiments may include that the lower base plate is free to move towards at least one of the first direction and the second direction. The adjustable seat further includes at least one biasing mechanism operably connected to the lower base plate. The at least one biasing mechanism being configured to reduce acceleration of the lower base plate towards at least one of the first direction and the second direction.

In addition to one or more of the features described herein, or as an alternative, further embodiments may include that a seat track assembly including a translation portion securely attached to the second seat section and a base portion operably connected to the translation portion, such that the translation portion is configured to linearly translate relative to the base portion. Further embodiments may also include a hinge operably connected to the base portion, such that the base portion may rotate relative to the hinge but not linearly translate relative to the hinge.

In addition to one or more of the features described herein, or as an alternative, further embodiments may include a seat track assembly including a translation portion securely attached to the third seat section and a base portion operably connected to the translation portion, such that the translation portion is configured to linearly translate relative to the base portion. Further embodiments may also include a hinge operably connected to the base portion such that the base portion may rotate relative to the hinge but not linearly translate relative to the hinge.

In addition to one or more of the features described herein, or as an alternative, further embodiments may include that the first support structure includes a first support arm. The adjustable seat further includes a hinge operably connecting the first support arm to the lower base plate, such that the first support arm may rotate relative to the lower base plate around the hinge but the hinge does not linearly translate relative to the lower base plate.

In addition to one or more of the features described herein, or as an alternative, further embodiments may include that the second support structure includes a second support arm. The adjustable seat further includes a hinge operably connecting the second support arm to the lower base plate, such that the second support arm may rotate relative to the lower base plate around the hinge but the hinge does not linearly translate relative to the lower base plate.

In addition to one or more of the features described herein, or as an alternative, further embodiments may include a reversible restraint system configured to secure the passenger in the adjustable seat when the passenger is sitting facing the first direction and secure the passenger in the adjustable seat when the passenger is sitting in the second direction. The reversible restraint system including a seat belt, a first D-ring anchor zone, a second D-ring anchor zone located opposite the first D-ring anchor zone, and an upper D-ring configured to secure to at least one of the first D-ring anchor zone and the second D-ring anchor zone, the seat belt being operably connected to the upper D-ring.

In addition to one or more of the features described herein, or as an alternative, further embodiments may include a D-ring track connecting the first D-ring anchor zone and the second D-ring anchor zone. The upper D-ring is configured to move along the D-ring track between the first D-ring anchor zone and the second D-ring anchor zone.

In addition to one or more of the features described herein, or as an alternative, further embodiments may include that the upper D-ring is configured to secure within the second D-ring anchor zone when the passenger is sitting facing the first direction. The upper D-ring is configured to secure within the first D-ring anchor zone when the passenger is sitting in the second direction.

In one exemplary embodiment, an adjustable seat for a vehicle is provided. The adjustable seat is configured to allow a passenger to sit facing a first direction and facing a second direction. The adjustable seat includes a first seat section configured to support a lower leg portion of the passenger, a second seat section configured to support an upper leg portion of the passenger, a third seat section configured to support a torso portion of the passenger, a fourth seat section configured to support a head portion of the passenger, and a lower base plate operably connected to the second seat section and the third seat section. The lower base plate is configured to rotate about a vertical axis between the first direction and the second direction. The first seat section, the second seat section, the third seat section, and the fourth seat section rotate with the lower base plate about the vertical axis.

In addition to one or more of the features described herein, or as an alternative, further embodiments may include that the lower base plate is free to move towards at least one of the first direction and the second direction. The adjustable seat further includes a biasing mechanism operably connected to the lower base plate. The biasing mechanism being configured to reduce acceleration of the lower base plate towards at least one of the first direction and the second direction.

In addition to one or more of the features described herein, or as an alternative, further embodiments may include a first support structure operably connecting the second seat section to the lower base plate and a second support structure operably connecting the third seat section to the lower base plate.

In addition to one or more of the features described herein, or as an alternative, further embodiments may include a reversible restraint system configured to secure the passenger in the adjustable seat when the passenger is sitting in the first direction and secure the passenger in the adjustable seat when the passenger is sitting in the second direction. The reversible restraint system being located on the lower base plate and secured to the vehicle through the lower base plate.

In addition to one or more of the features described herein, or as an alternative, further embodiments may include that the reversible restraint system includes a seat belt and an upper D-ring secured to the third seat section or the fourth seat section, the seat belt being operably connected to the upper D-ring.

In addition to one or more of the features described herein, or as an alternative, further embodiments may include that the reversible restraint system includes: a seat belt retractor operably connected to the seat belt. The seat belt retractor being located on the lower base plate.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, exemplary embodiments may employ various integrated circuit components (e.g., memory elements, digital signal processing elements, logic elements, look-up tables, or the like), which may carry out a variety of functions under the control of one or more microprocessors or other control devices. In addition, those skilled in the art will appreciate that exemplary embodiments may be practiced in conjunction with any number of control systems, and that the vehicle systems described herein are merely exemplary embodiments.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or connections may be present in various embodiments.

In the near future autonomous vehicles may be able to pick up passengers and deliver passengers to a destination without the input of a human driver. Autonomous vehicles may be capable of operating for extended periods of time without any input or oversight from a human driver. This frees up a great deal of time for passengers of the vehicle, allowing the passengers to do many things while riding in the car, which may include sleeping. In addition, limousines and other forms of transportation such as buses, trains, boats, planes and some seating positions in conventional vehicles may offer this ability.

Embodiments disclosed herein seek to provide adjustable seats for allowing an individual to sleep comfortably within a vehicle in a first direction or a second direction opposite the first direction. As described herein, the adjustable seat includes one or more seat sections that are roughly configured to position the passenger in a V-shaped seating orientation so the seat sections themselves work in tandem with a seat belt to restrain the passenger from moving forward and/or rearward relative to the vehicle in the event of a rapid deceleration thereof. The V-shaped seating orientation provides a comfortable resting/sleeping position while at the same time providing additional restraint to the passenger in the event of a rapid deceleration of the vehicle.

Figure 1:
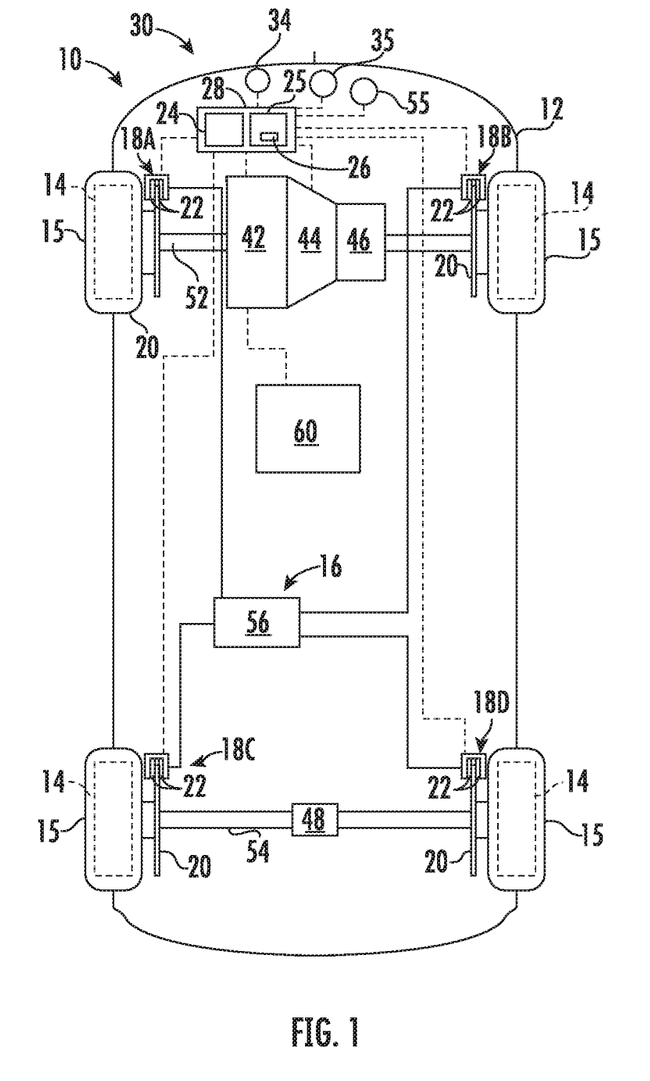
FIG. 1 is an illustration of an autonomous or semi-autonomous vehicle, according to an embodiment of the present disclosure.

Referring now to FIG. 1, a vehicle 10 has a vehicle body 12 that is operatively connected to rotatable wheels 14 for moving the vehicle body when propelled by a propulsive motor 42. In an embodiment, the vehicle 10 may be a car but it is understood that the embodiments disclosed herein are not limited to cars and may be applicable to other passenger vehicles including but not limited to boats, airplanes, buses, trains, tunnel pods, or any other vehicle known to one of skill in the art. In an embodiment, the propulsive motor 42 is an electric motor but is understood that the embodiments disclosed herein are not limited to vehicles 10 propelled by an electric motor, thus the embodiments disclosed herein may also be applicable to propulsive motors including but not limited to vehicles propelled entirely and/or partially by an internal combustion engine, or any other propulsive motor known to one of skill in the art. In an embodiment, the vehicle 10 includes a single propulsive motor 42 but is understood that the embodiments disclosed herein are not limited to vehicles propelled by a single propulsive motor, thus the embodiments disclosed herein may also be applicable vehicles propelled by any number of propulsive motors. In an embodiment, propulsive motors 42 may be located at each rotatable wheel 14 (not shown).

The vehicle 10 may also include an energy storage device 60 operably connected to the propulsive motor 42. The energy storage device 60 may be configured to provide electrical energy or a combustible fluid to the propulsive motor. The energy storage device 60 may include a battery system (e.g., a battery or bank of batteries), fuel cells, flow battery, a fuel tank and others devices capable of storing and outputting energy to the propulsive motor 42. The vehicle 10 may or may not include a transmission 44 operably connecting the propulsion motor 42 to at least one of the front wheel axle 52 and the rear wheel axle 54. In one non-limiting example, the vehicle 10 is a front wheel-drive vehicle. A front differential 46 may operatively connect the front wheels 14 and a rear differential 48 operatively connects the rear wheels 14 via half shafts as is known. Tires 15 are shown mounted on the wheels 14. The vehicle 10 includes a braking system 16 that is configured to stop rotation of the wheels 14. The braking system 16 includes a fluid pressure source 56 in communication with respective braking mechanisms 18 operatively connected with each respective wheel 14. The braking mechanisms 18 each have a brake rotor 20 rotatable with the respective wheel 14.

In an embodiment, the vehicle 10 may be semi-autonomous or fully autonomous but it is understood that the embodiments disclosed herein are not limited to semi-autonomous or fully autonomous vehicles and may be applicable to other non-autonomous vehicles. The vehicle 10 may include an autonomous vehicle driving system 30 capable of driving the vehicle 10 semi-autonomously and/or fully autonomously. The autonomous vehicle driving system 30 on the vehicle 10 includes various vehicle sensors including but not limited to a vehicle location sensor 55, a vehicle collision avoidance sensor 35, and a vehicle systems monitoring sensor 34.

Although only one vehicle location sensor 55 is depicted many more vehicle location sensors may be included in the autonomous vehicle driving system 30. The location of the vehicle 10 may include a geographic location, such as, for example, a global positioning system (GPS) location of the vehicle. The location of the vehicle may also include a lane-location of the vehicle, such as, for example, the location of the vehicle within a driving lane or a parking spot.

Although only one vehicle collision avoidance sensor 35 is depicted many more vehicle collision avoidance sensors may be included in the autonomous vehicle driving system 30. The vehicle collision avoidance sensor 35 may be configured to determine objects surrounding the vehicle 10 that may pose a risk of collision, such as, for example, buildings, walls, curbs, other vehicles, guard rails, or any other object that may potentially collide with the vehicle. The vehicle collision avoidance sensor 35 may be configured to determine the object and a distance between an object and the vehicle 10. The vehicle collision avoidance sensor 35 may utilize various sensing methods including but not limited to radio detecting and ranging (RADAR), light detecting and ranging (LIDAR), image recognition through a camera, or any other sensing method known to one of skill in the art.

Although only one vehicle systems monitoring sensor 34 is depicted many more vehicle systems monitoring sensors may be included in the autonomous vehicle driving system 30. The vehicle systems monitoring sensor 34 may be configured to monitor various vehicle systems including but not limited to the propulsion motor 42 and the braking system 16. The input from the vehicle systems monitoring sensor 34 may include, but is not limited to, propulsion motor speeds, energy storage device parameters, wheel speeds, vehicle speed, longitudinal acceleration, dynamic brake proportioning, brake apply, vehicle grade, brake temperature (brake pad, or brake fluid).

The autonomous vehicle driving system 30 also includes a controller 28 that is in electronic communication with the vehicle location sensor, the vehicle collision avoidance sensor, and the vehicle systems monitoring sensor. The controller 28 receives input signals from the vehicle location sensor 55, the vehicle collision avoidance sensor 35, and the vehicle systems monitoring sensor 34, so that a processor 24 of the controller can carry out stored algorithm(s) 26 for semi-autonomous and/or fully autonomous driving.

It should be appreciated that the electronic controller 28 may be configured as a single or distributed control device that is electrically connected to or otherwise placed in hard-wired or wireless communication with the propulsion motor 42, the transmission 44, the braking system 16, and various vehicle components, including sensors, for transmitting and receiving electrical signals for proper execution of the algorithm 26.

The electronic controller 28 includes one or more control modules, with one or more processors 24 and tangible, non-transitory memory 25 (e.g., read-only memory (ROM)) whether optical, magnetic, flash, or otherwise. The electronic controller 28 may also include sufficient amounts of random access memory (RAM), electrically-erasable programmable read-only memory (EEPROM), and the like, as well as a high-speed clock, analog-to-digital (A/D) and digital-to-analog (D/A) circuitry, and input/output circuitry and devices (I/O), as well as appropriate signal conditioning and buffer circuitry.

The electronic controller 28 can be a host machine or distributed system (e.g., a computer such as a digital computer or microcomputer) acting as a vehicle control module, and/or as a proportional-integral-derivative (PID) controller device having a processor, and, as the memory, tangible, non-transitory computer-readable memory such as read-only memory (ROM) or flash memory. Therefore, the controller 28 can include all software, hardware, memory, algorithms, connections, sensors, etc., necessary to monitor the vehicle 10 and control the autonomous vehicle driving system 30. As such, one or more control methods executed by the controller 28 can be embodied as software or firmware associated with the controller. It is to be appreciated that the controller can also include any device capable of analyzing data from various sensors, comparing data, and making decisions required semi-autonomous or fully autonomous driving. Moreover, the electronic controller 28 can be configured in different embodiments to include a brake controller, a powertrain controller, and other controllers onboard or offboard the vehicle 10.

Figure 2:
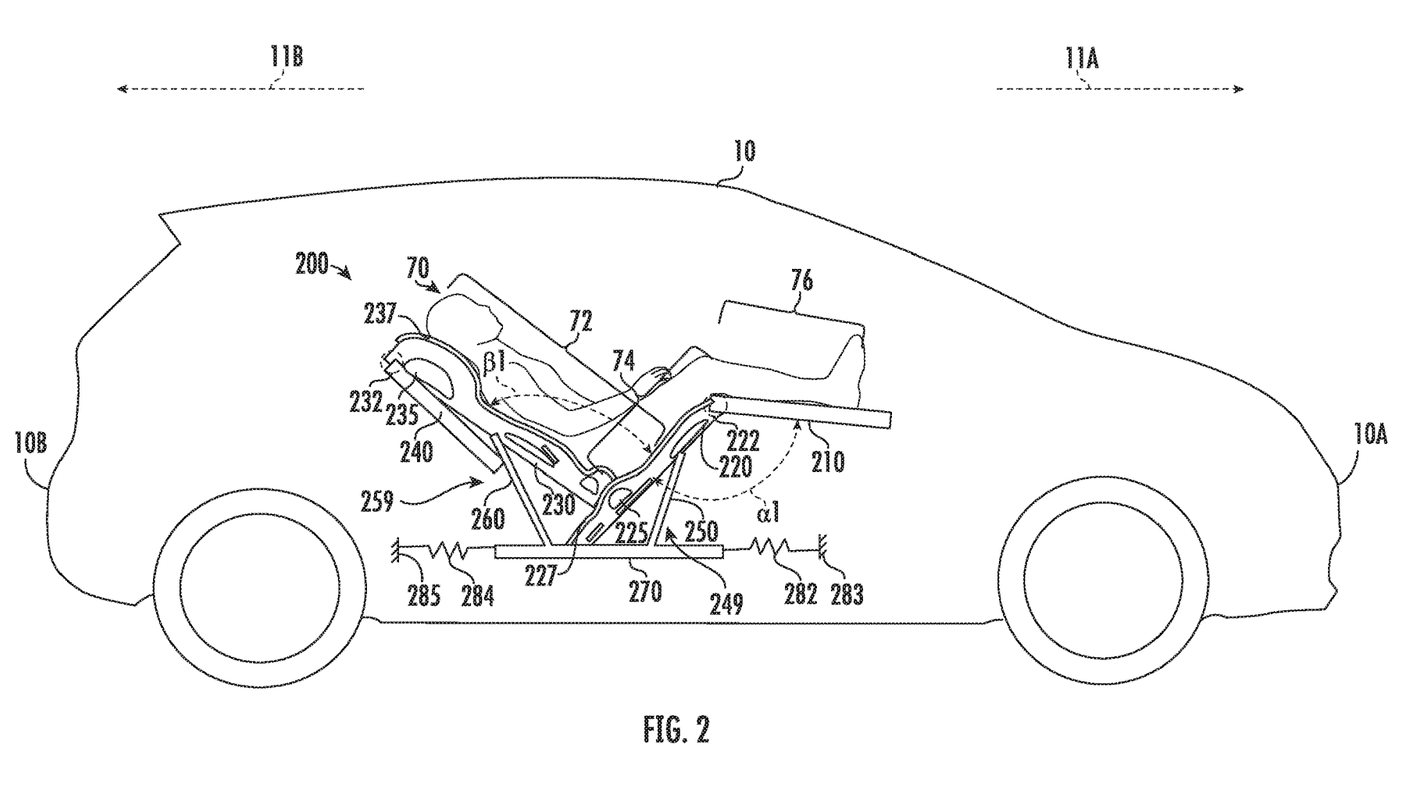
FIG. 2 is a side view of an adjustable seat facing the first direction, according to an embodiment of the present disclosure.
Figure 3:
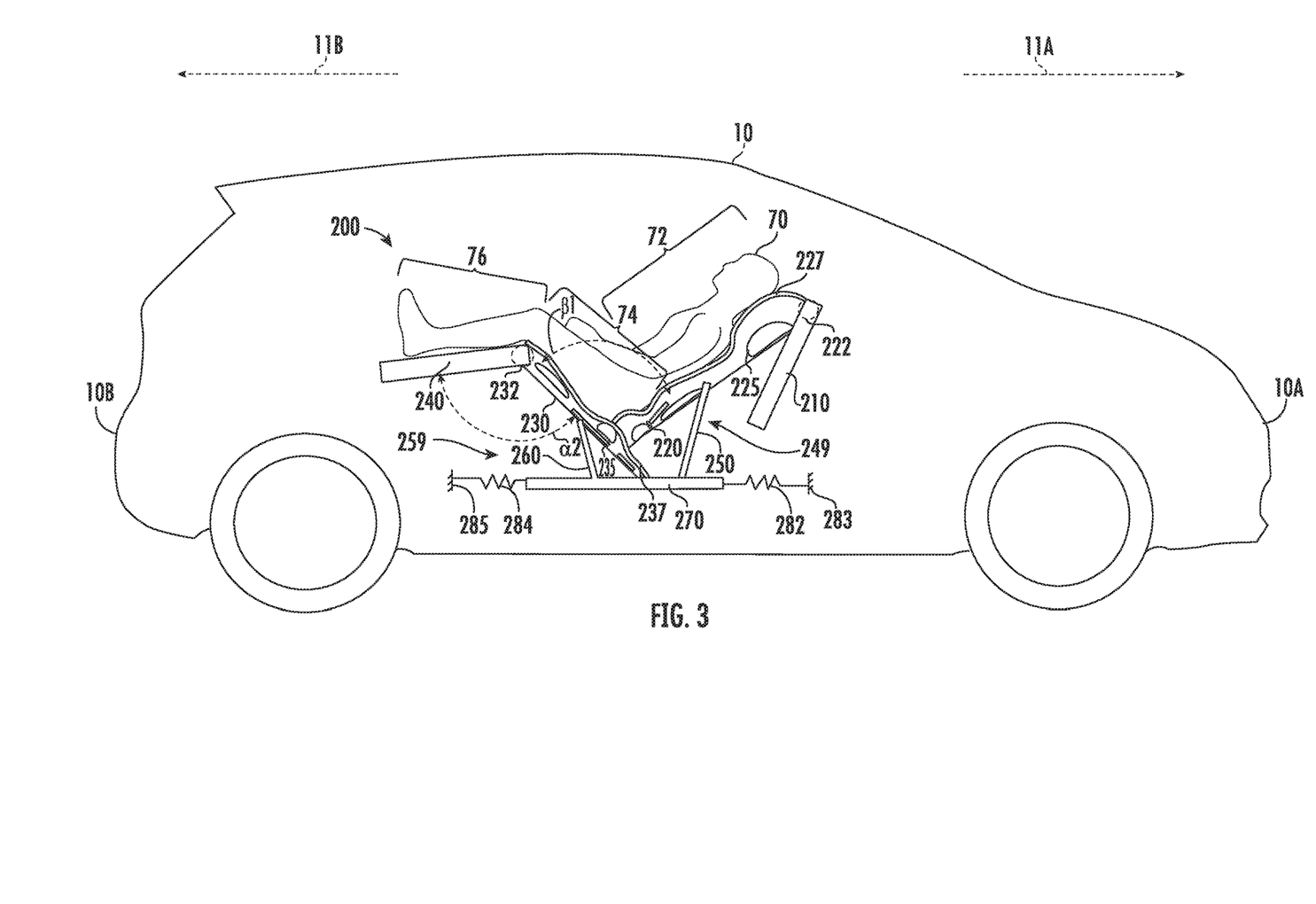
FIG. 3 is a side view of the adjustable seat in the second direction, according to an embodiment of the present disclosure.

Referring to FIGS. 2 and 3, with continued reference to FIG. 1, a side view of an adjustable seat 200 for the vehicle 10 is illustrated, according to an embodiment of the present disclosure. The adjustable seat 200 illustrated in FIGS. 2 and 3 is configured to allow a passenger 70 to sit facing a first direction 11A and/or facing a second direction 11B. In an embodiment, the first direction 11A may be towards a front 10A of the vehicle 10 as shown in FIG. 2 (i.e., forward facing) and the second direction 11B may be towards a rear 10B of the vehicle 10 as shown in FIG. 3 (i.e., rearward facing). It is understood that the embodiments are not limited to the first direction 11A and the second direction 11B, and thus the adjustable seat 200 may be adjusted to face any direction of the vehicle 10 including but not limited to lateral directions perpendicular to the first direction 11A and the second direction 11B and any direction therebetween. The adjustable seat 200 may include a first seat section 210, a second seat section 220, a third seat section 230, and a fourth seat section 240. It is understood that while four seat sections 210, 220, 230, 240 are illustrated, the embodiments disclosed herein may be applicable to more or less than four seat sections.

By utilizing the seat sections 210, 220, 230, 240, the adjustable seat 200 is configured to provide support to a lower leg portion 76, an upper leg portion 74, and a torso and head portion 72 of the passenger 70 when the passenger is sitting facing the first direction 11A or the second direction 11B. The lower leg portion 76 may include the legs of the passenger 70 below the knees. The upper leg portion 74 may include the legs of the passenger 70 above the knees and below the waist. The torso and head portion 72 is the body of the passenger 70 above the waist.

As illustrated in FIG. 2, the first seat section 210 is configured to support the lower leg portion 76 of the passenger 70 when the passenger is sitting facing the first direction 11A. As illustrated in FIG. 3, the first seat section 210 is not configured to support the passenger 70 when the passenger is sitting facing the second direction 11B. Thus, the first seat section 210 may be rotated from the support position shown in FIG. 2 to a storage position shown in FIG. 3. The first seat section 210 may be rotated relative to the second seat section 220 through an angle α1 as measured between the first seat section 210 and the second seat section 220, as shown in FIG. 2. The first seat section 210 may be rotated relative to the second seat section 220 at a hinge 222 operably connected to the first seat section 210, as shown in FIGS. 2 and 3. The hinge 222 may operably connect the first seat section 210 to the second seat section 220. The hinge 222 rotation can be adjusted manually or with a motor (not shown) and can lock in place as is done for a conventional seat recliner that reclines a seat back with respect to a seat bottom. As illustrated in FIG. 2, the second seat section 220 is configured to support the upper leg portion 74 of the passenger 70 when the passenger 70 is sitting facing the first direction 11A. As illustrated in FIG. 3, the second seat section 220 is configured to support the torso and head portion 72 of the passenger 70 when the passenger 70 is sitting facing the second direction 11B. The second seat section 220 may include one or more inflatable bladders 225 configured to inflate to adjust an outer surface 227 of the second seat section 220 to conform to the upper leg portion 74 of the passenger 70 when the passenger 70 is sitting facing the first direction 11A. The one or more inflatable bladders 225 may also be configured to inflate and adjust the outer surface 227 of the second seat section 220 to conform to the torso and head portion 72 of the passenger 70 when the passenger 70 is sitting facing the second direction 11B. The inflatable bladders 225 push outward on a seat comfort material (not shown) that may be present between the inflatable bladders 225 and the outer surface 227 and raise the outer surface 227. A seat comfort material may include but is not limited to foam.

As illustrated in FIG. 2, the third seat section 230 is configured to support the torso and head portion 72 of the passenger 70 when the passenger 70 is sitting facing the first direction 11A. As illustrated in FIG. 3, the third seat section 230 is configured to support the upper leg portion 74 of the passenger 70 when the passenger 70 is sitting facing the second direction 11B. The third seat section 230 may include one or more inflatable bladders 235 configured to adjust an outer surface 237 of the third seat section 230 to conform to the torso and head portion 72 of the passenger 70 when the passenger 70 is sitting facing the first direction 11A. The one or more inflatable bladders 235 may also be configured to inflate and adjust the outer surface 237 of the third seat section 230 to conform to the upper leg portion 74 the passenger 70 when the passenger 70 is sitting facing the second direction 11B. The inflatable bladders 235 push outward on a seat comfort material (not shown) that may be present between the inflatable bladders 235 and the outer surface 237 and raise the outer surface 237. A seat comfort material may include but is not limited to foam.

Although not illustrated similar bladders to the inflatable bladders 225 of the second seat section 220 and the inflatable bladders 235 of the third seat section 230 may be included in the first seat section 210 and/or the fourth seat section 240. The inflatable bladders 225, 235 may be controlled individually or controlled as a system. The inflation of inflatable bladders 225, 235 can be automated or can be manually over-ridden/adjusted by the occupants via one or more control devices/switches.

As illustrated in FIG. 2, the fourth seat section 240 is configured to support none of the passenger 70 (i.e., the fourth seat section 240 does not support the passenger 70) when the passenger 70 is sitting facing the first direction 11A. As illustrated in FIG. 3, the fourth seat section 240 is configured to support the lower leg portion 76 of the passenger 70 when the passenger 70 is sitting facing the second direction 11B. Thus, the fourth seat section 240 may be rotated from the support position shown in FIG. 3 to a storage position shown in FIG. 2. The fourth seat section 240 may be rotated relative to the third seat section 230 through an angle $\alpha 2$ as measured between the fourth seat section 240 and the third seat section 230, as shown in FIG. 3. The fourth seat section 240 may be rotated relative to the third seat section 230 at a hinge 232 operably connected to the fourth seat section 240, as shown in FIGS. 2 and 3. The hinge 232 may operably connect the fourth seat section 240 to the third seat section 230. The hinge 232 rotation can be adjusted manually or with a motor (not shown) and can lock in place as is done for a conventional seat recliner that reclines a seat back with respect to a seat bottom.

The adjustable seat 200 may also include a first support structure 249 having a first support arm 250, a second support structure 259 having a second support arm 260, and a lower base plate 270. The first support arm 250 operably connects the second seat section 220 to the lower base plate 270. The first support arm 250 may be configured to extend and retract to adjust the position (e.g., orientation) of the second seat section 220. The second support arm 260 operably connects the third seat section 230 to the lower base plate 270. The second support arm 260 may be configured to extend and retract to adjust the position (e.g., orientation) of the third seat section 230. The first support arm 250 and the second support arm 260 may be configured to adjust an angle $\beta 1$ between the second seat section 220 and the third seat section 230. The angle $\beta 1$ between the second seat section 220 and the third seat section 230 may vary depending on whether the passenger 70 is sitting facing the first direction 11A or the second direction 11B. The first support arm 250 may be configured to move the second seat section 220 to orient it facing the first direction 11A or to orient it facing the second direction 11B. The second support arm 260 may be configured to move the third seat section 230 to orient it facing the first direction 11A or to orient it facing the second direction 11B. In an embodiment, the first support arm 250 and the second support arm 260 may include actuators and/or servos.

The adjustable seat 200 may also include a first biasing mechanism 282 and a second biasing mechanism 284. The first biasing mechanism 282 may be interposed between the lower base plate 270 and a forward vehicle structure 283. In embodiment, the first biasing mechanism 282 may operate in at least one of tension and compression. In an embodiment, the first biasing mechanism 282 may be an energy absorbing mechanism. The second biasing mechanism 284 may be interposed between the lower base plate 270 and a rear vehicle structure 285. In embodiment, the second biasing mechanism 284 may operate in at least one of tension and compression. In an embodiment the second biasing mechanism 284 may be an energy absorbing mechanism. The lower base plate 270 may be free to move (e.g., via a roller system and track) towards the front 10A of the vehicle 10 and at least one of the first biasing mechanism 282 and the second biasing mechanism 284 may be configured to reduce acceleration of the lower base plate 270 towards the front 10A of the vehicle 10. The lower base plate 270 may free to move towards the rear 10B of the vehicle 10 and at least one of the first biasing mechanism 282 and the second biasing mechanism 284 may be configured to reduce acceleration of the lower base plate 270 towards the rear 10B of the vehicle 10. The first biasing mechanism 282 and the second biasing mechanism 284 may be operably connected to the lower base plate 270.

Figure 4:
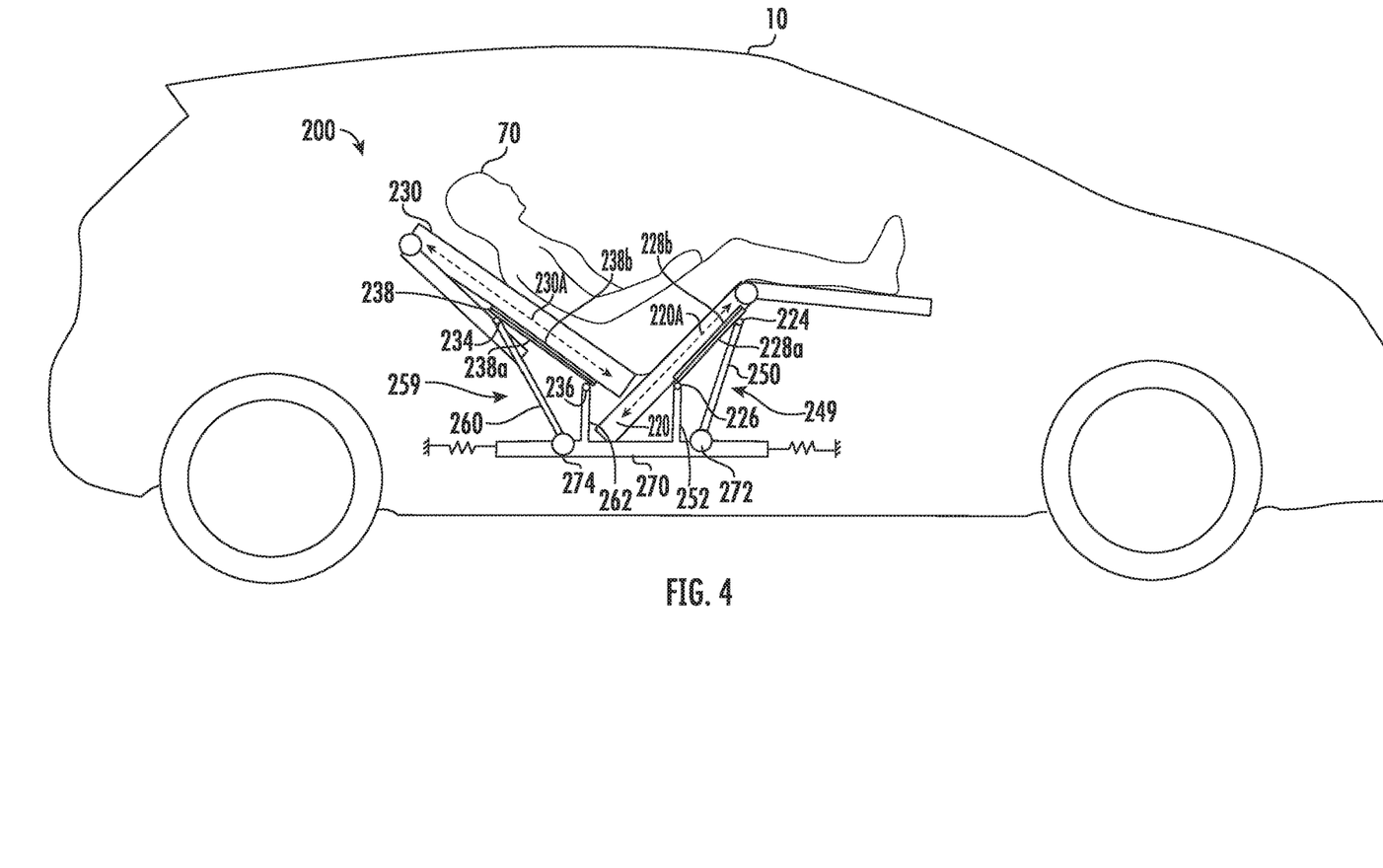
FIG. 4 is a side view of the adjustable seat having seat tracks, according to an embodiment of the present disclosure.

Referring to FIG. 4, with continued reference to FIGS. 1-3, a side view of an adjustable seat 200 for the vehicle 10 is illustrated, according to an embodiment of the present disclosure. As shown in FIG. 4, the adjustable seat 200 may include a first support structure 249 having multiple hinges 224, 226, 272, a first support arm 250, a first structural support 252, a seat track assembly 228, a second support structure 259 having contains multiple hinges 234, 236, 274, a second support arm 260, a second structural support 262, and a seat track assembly 238 to aid in the adjustment of the adjustable seat 200.

The second seat section 220 may include a seat track assembly 228 operably connected to the second seat section 220. The seat track assembly 228 includes a translation portion 228b that is securely attached to the second seat section 220 and a base portion 228a operably connected to the translation portion 228b. The translation portion 228b is configured to linearly translate relative to the base portion 228a. The translation portion 228b can move the second seat section 220 (or a seat comfort surface of the second seat section 220) relative to the base portion 228a via a motor or a manual system, similar to a powered or manual seat adjuster on a conventional vehicle that allows fore-aft seat translation. The first support arm 250 may be operably connected to the second seat section 220 through the seat track assembly 228. The first support arm 250 may be operably connected to the seat track assembly 228 through a hinge 224, which is operably connected to the base portion 228a. The hinge 224 may be operably connected to the base portion 228a of the seat track assembly 228, such that the base portion 228a may rotate relative to the hinge 224 but not linearly translate relative to the hinge 224. The adjustable seat 200 may also include a first structural support 252 that may be operably connected to the base portion 228a through a hinge 226.

The hinge 226 may be operably connected to the base portion 228a, such that the seat track assembly 228 may rotate relative to the hinge 226. A first structural support 252 connects the hinge 226 to the lower base plate 270. The first structural support 252 provides structural support to the adjustable seat 200. The second seat section 220 may linearly translate along seat axis 220A in FIG. 4. The first support arm 250 may be operably connected to the lower base plate 270 through a hinge 272, such that the first support arm 250 may rotate relative to the lower base plate 270 around hinge 272 but the hinge 272 does not linearly translate relative to the lower base plate 270. To change the angle β1 between the second seat section 220 and the third seat section 230, at least one of the first support arm 250 and the first structural support 252 may be configured to extend or retract, similar to a slider joint on conventional fore-aft seat track that can be moved and locked into place via motorized power or a manual process.

The third seat section 230 may include a seat track assembly 238 operably connected to the third seat section 230. The seat track assembly 238 includes a translation portion 238b that is securely attached to the third seat section 230 and a base portion 238a operably connected to the translation portion 238b. The translation portion 238b is configured to linearly translate relative to the base portion 238a. The translation portion 238b can move the third seat section 230 (or a seat comfort surface of the third seat section 230) relative to the base portion 238a via a motor or a manual system similar to a powered or manual seat adjuster on a conventional vehicle that allows fore-aft seat translation. The second support arm 260 may be operably connected to the third seat section 230 through the seat track assembly 238. The second support arm 260 may be operably connected to the seat track assembly 238 through a hinge 234, which is operably connected to the base portion 238a. The hinge 234 may be operably connected to the seat track base portion 238a, such that the base portion 238a may rotate relative to the hinge 234 but not linearly translate relative to the hinge 234. The adjustable seat 200 may also include a second structural support 262 that may be operably connected to the base portion 238a through a hinge 236.

The hinge 236 may be operably connected to the base portion 238a, such that the seat track assembly 238 may rotate relative to the hinge 236. The second structural support 262 connects the hinge 236 to the lower base plate 270. The second structural support 262 provides structural support to the adjustable seat 200. The third seat section 230 may linearly translate along a seat axis 230A in FIG. 4 when the translation portion 238a moves relative to the base portion 238b. The second support arm 260 may be operably connected to the lower base plate 270 through a hinge 274, such that the second support arm 260 may rotate relative to the lower base plate 270 around hinge 274 but the hinge 274 does not linearly translate relative to the lower base plate 270. To change the angle β1 between the third seat section 230 and the second seat section 220, at least one of the second support arm 260 and the second structural support 262 may be configured to extend or retract, similar to a slider joint on conventional fore-aft seat track that can be moved and locked into place via motorized power or a manual process.

In another embodiment, the locations of the first support arm 250 and the first structural support 252 may be reversed, such that the first support arm 250 is nearer a center of the adjustable seat 200 and the first structural support 252 is nearer an outer portion of the adjustable seat 200. In yet another embodiment, the locations of the second support arm 260 and the second structural support 262 may be reversed, such that the second support arm 260 is nearer the center of the adjustable seat 200 and the second structural support 262 is nearer the outer portion of the adjustable seat 200.

Figure 5:
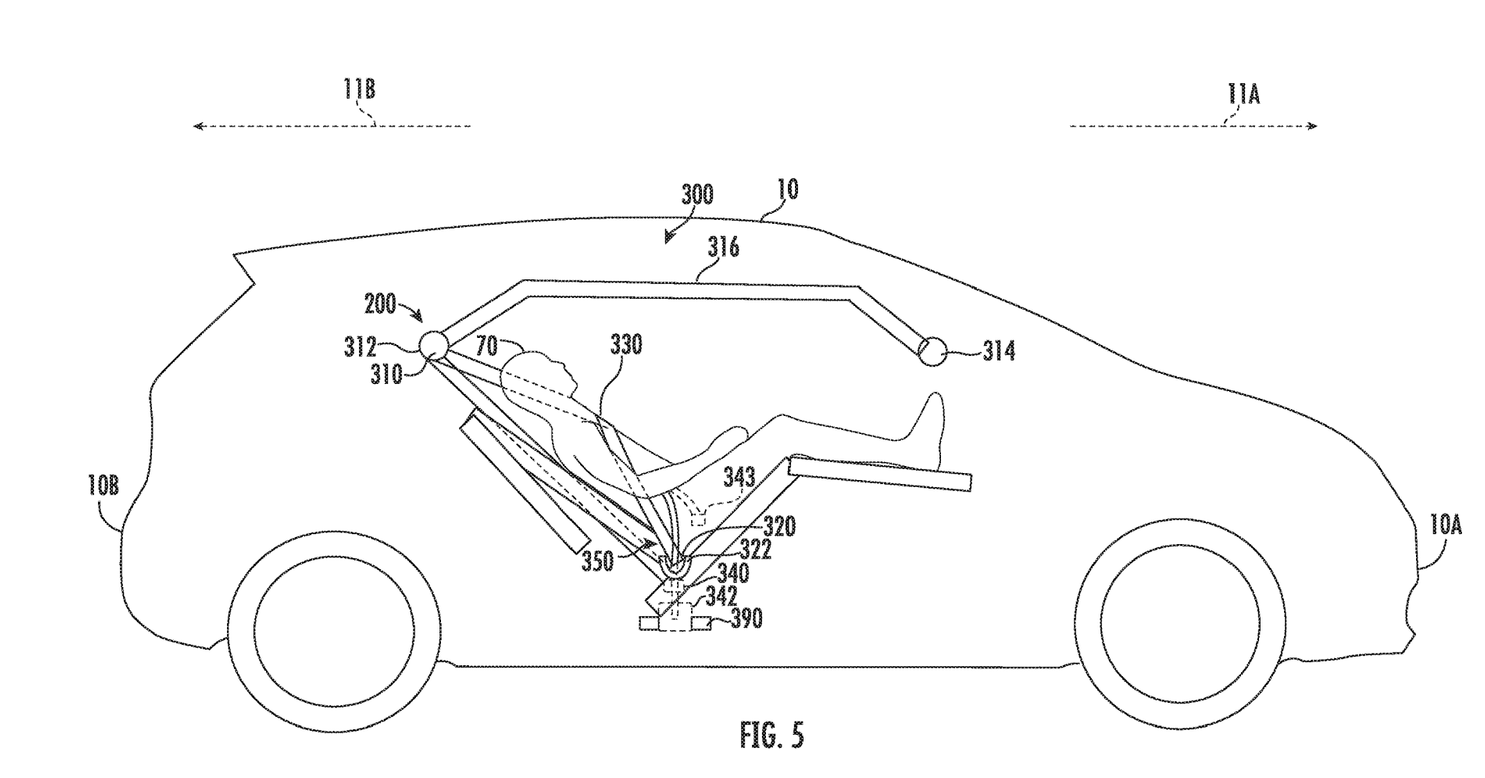
FIG. 5 is a side view of the adjustable seat facing the first direction with a reversible restraint system, according to an embodiment of the present disclosure.
Figure 6:
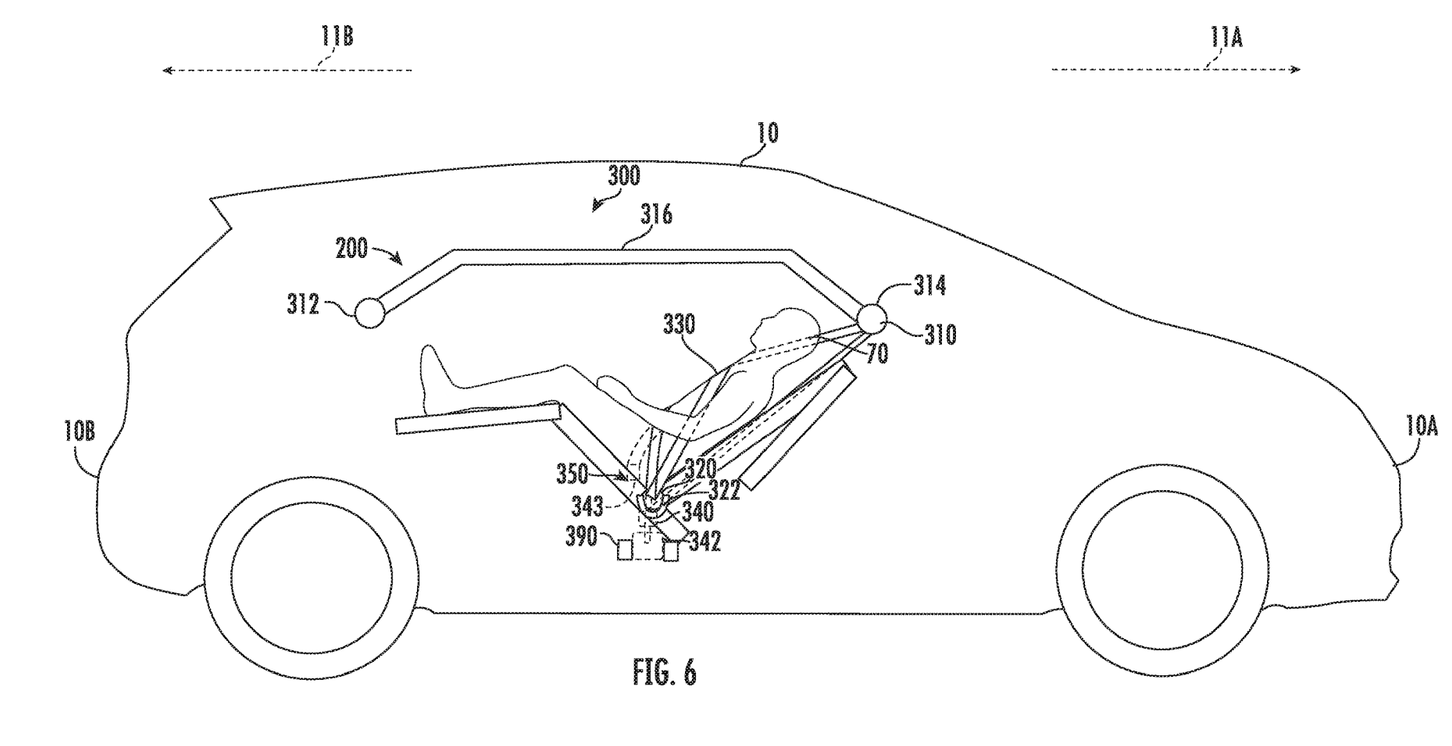
FIG. 6 is a side view of the adjustable seat facing the second direction with the reversible restraint system, according to an embodiment of the present disclosure.

Referring to FIGS. 5-6, with continued reference to FIGS. 1-4, a side view of the adjustable seat 200 having a reversible restraint system 300 is illustrated, according to an embodiment of the present disclosure. The reversible restraint system 300 illustrated in FIGS. 5 and 6 is configured to secure the passenger 70 in the adjustable seat 200 when the passenger 70 is sitting in a first direction 11A as shown in FIG. 5 and/or in a second direction 11B as shown in FIG. 6. In an embodiment, the first direction 11A may be towards a front 10A of the vehicle 10 as shown in FIG. 5 (i.e., forward facing) and the second direction 11B may be towards a rear 10B of the vehicle 10 as shown in FIG. 6 (i.e., rearward facing). It is understood that the embodiments are not limited to the first direction 11A being towards the front 10A of the vehicle 10 and the second direction 11B being towards the rear 10B of the vehicle 10, and thus the adjustable seat 200 may be adjusted to face any direction of the vehicle 10 including but not limited to lateral directions perpendicular to the front 10A and rear 10B and any direction therebetween. The reversible restraint system 300 may include a first D-ring anchor zone 312 that is used to allow a passenger 70 to sit facing the first direction 11A and a second D-ring anchor zone 314 that is used to allow a passenger 70 to sit facing the second direction 11B. The first D-ring anchor zone 312 and the second D-ring anchor zone 314 may be secured to a structural frame of the vehicle 10. The second D-ring anchor zone 314 is located opposite of the first D-ring anchor zone 312.

The reversible restraint system 300 includes an upper D-ring 310. The upper D-ring 310 may be anchored/secured within either the first D-ring anchor zone 312 or to the second D-ring anchor zone 314. The first D-ring anchor zone 312 and the second D-ring anchor zone 314 may be mounted in either an outboard location of the vehicle 10 or in a central location of the vehicle 10. The reversible restraint system 300 may also include a lower D-ring 340 and a seat belt retractor 342 located on the same side of the vehicle 10 as the first D-ring anchor zone 312 and the second D-ring anchor zone 314. The reversible restraint system 300 may also include a buckle 322 located on the opposite side of the occupant than the first D-ring anchor zone 312 and the second D-ring anchor zone 314. For example, if the first D-ring anchor zone 312 and the second D-ring anchor zone 314 are located on an outboard side of the vehicle 10 then the buckle 322 may be located proximate a central location of the vehicle 10. A lower anchor 343 is located at the end of the seatbelt 330 near the seat belt retractor 342. The buckle 322, the seat belt retractor 342, the lower D-ring 340, and the lower anchor 343 may all be mounted to a seat platform 390, which may be immovable or movable to absorb energy similar to the lower base plate 270 illustrated in FIGS. 3 and 4, which utilizes biasing mechanism 284, 282 to absorb energy. Alternatively, the buckle 322, the seat belt retractor 342, the lower D-ring 340, and the lower anchor 343 may be mounted to the structural frame of the vehicle 10.

The upper D-ring 310 may be anchored to the first D-ring anchor zone 312 when the passenger 70 is sitting in a first direction 11A. The upper D-ring 310 may be anchored to the second D-ring anchor zone 314 when the passenger 70 is sitting facing the second direction 11B. A D-ring track 316 may connect the second D-ring anchor zone 314 to the first D-ring anchor zone 312. The upper D-ring 310 may move or linearly translate along the D-ring track 316 between the first D-ring anchor zone 312 and the second D-ring anchor zone 314. The upper D-ring 310 may move or linearly translate automatically along the D-ring track 316 between the first D-ring anchor zone 312 and the second D-ring anchor zone 314 when the adjustable seat 200 is adjusted to allow the passenger 70 to sit facing the first direction 11A or to allow the passenger 70 to sit facing the second direction 11B. The movement of the upper D-ring 310 along the D-ring track 316 may be motorized using various mechanisms, such as, for example a motorized flexible worm drive. Alternatively, the movement of the upper D-ring 310 along the D-ring track 316 could be done manually similar to a manual D-ring adjustment mechanism that is conventionally utilized in a B-pillar of a vehicle for conventional seatbelts.

The reversible restraint system 300 includes a seat belt 330 that routes from a seat belt retractor 342 to the lower D-ring 340 to the upper D-ring 310 to the latch plate 320 to the lower anchor 343. The seat belt 330 is operably connected to the upper D-ring 310 of the reversible restraint system 300 located opposite the first side 350. The seat belt 330 may be operably connected to the upper D-ring 310 by threading the seat belt 330 through the upper D-ring 310. The seat belt 330 includes a latch plate 320 that may secure it to a buckle 322 located on the adjustable seat 200 or to the seat platform 390 on the first side 350. The seat belt 330 terminates at a lower anchor 343 that may be attached to the adjustable seat 200 or to the seat platform 390 opposite the first side 350. Located proximate a second side of the adjustable seat 200 opposite the first side 350, the seat belt 330 is directed through a lower D-ring 340 and then into a seat belt retractor 342. The lower D-ring 340 and the seat belt retractor 342 may be secured to a structural frame of the vehicle 10 or to the seat platform 390. Note, as an alternative embodiment, the lower anchor 343 may be replaced with a second seat belt retractor and the latch plate 320 could be physically attached to the seat belt webbing so it cannot slide along the webbing length.

Figure 7:
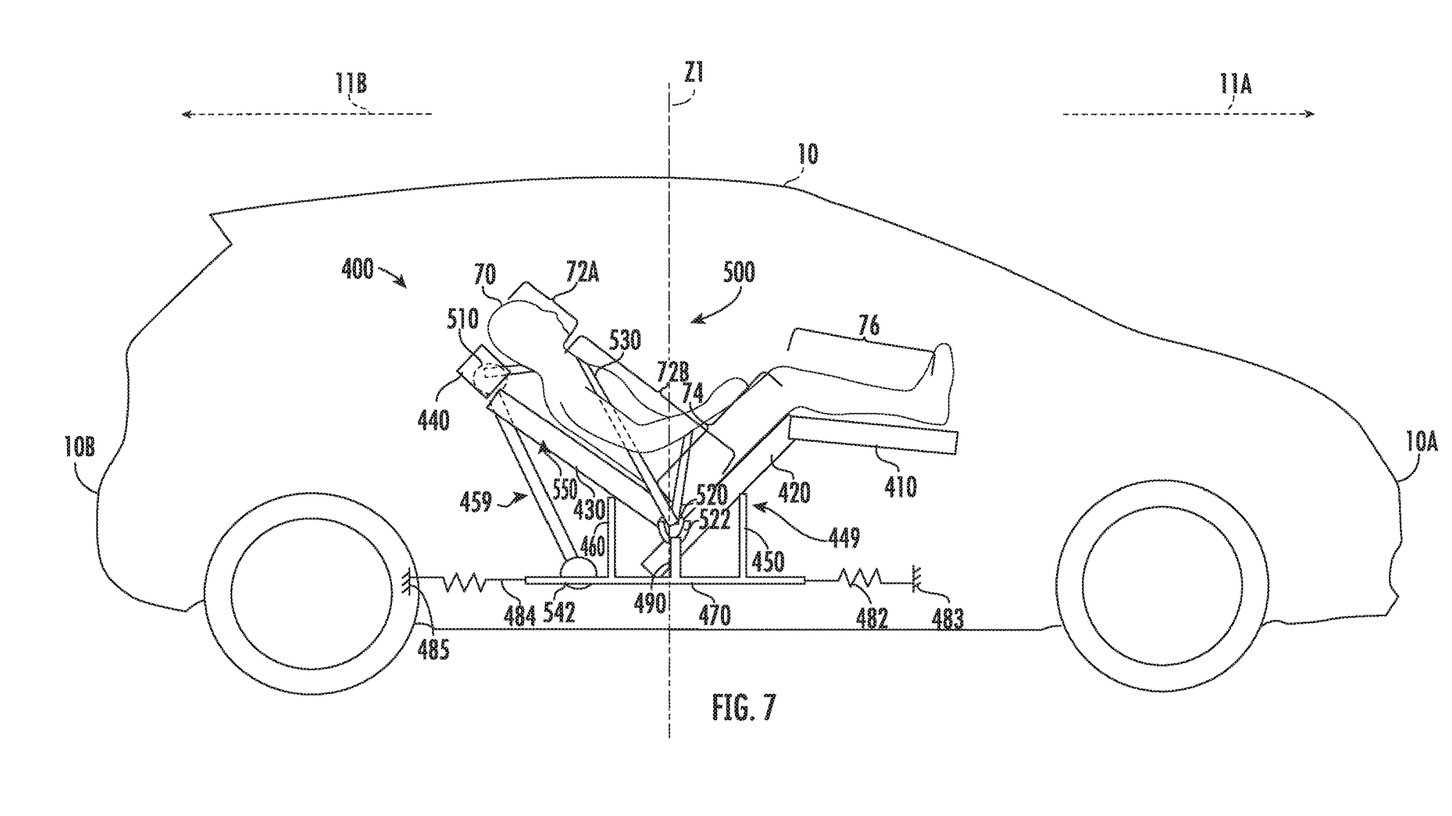
FIG. 7 is a side view of an adjustable seat facing the first direction on a rotatable lower base plate having a reversible restraint system, according to an embodiment of the present disclosure.
Figure 8:
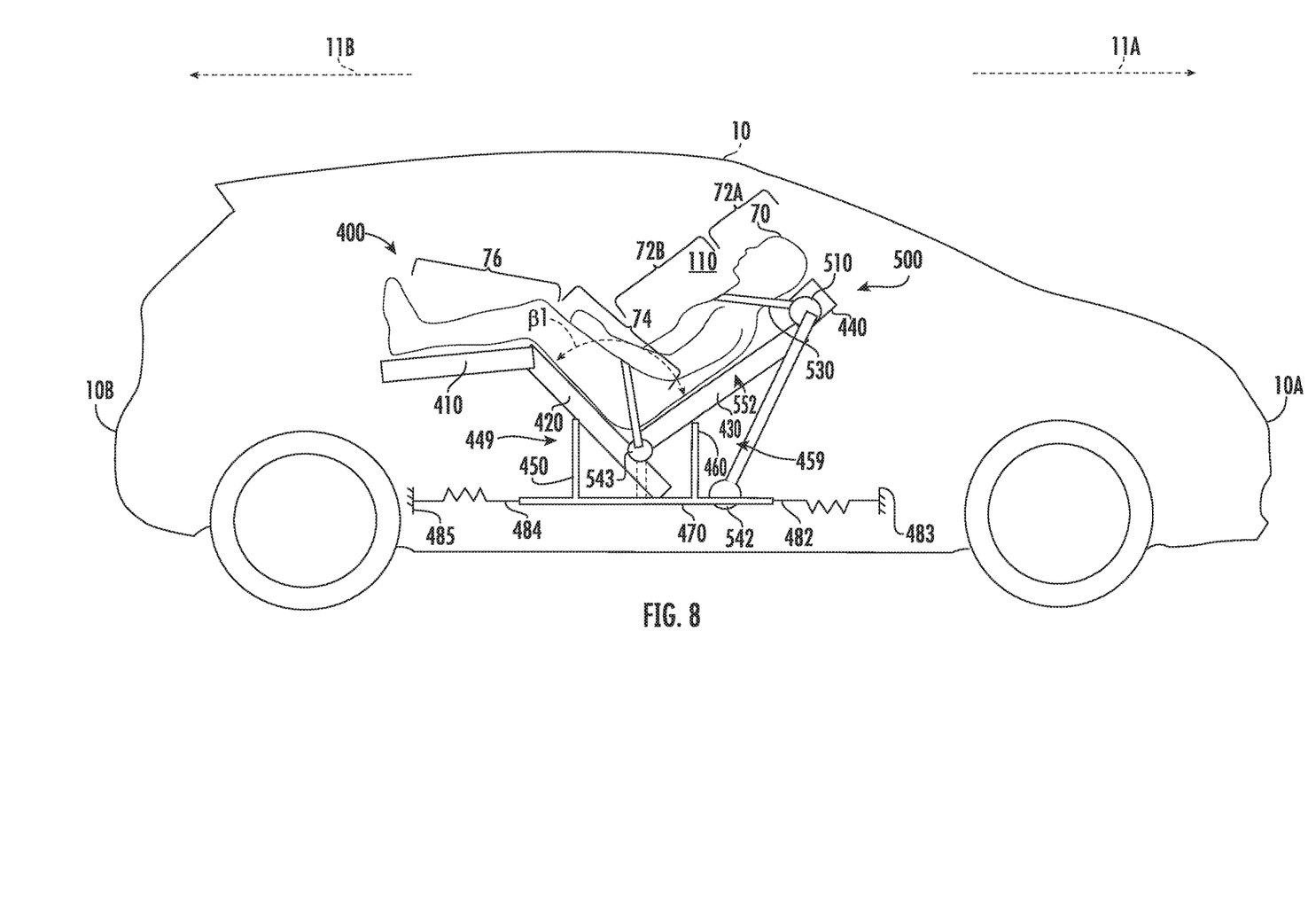
FIG. 8 is a side view of an adjustable seat facing the second direction on the rotatable lower base plate having the reversible restraint system, according to an embodiment of the present disclosure.

Referring to FIGS. 7-8, with continued reference to FIG. 1, a side view of an adjustable seat 400 for the vehicle 10 is illustrated, according to an embodiment of the present disclosure. The adjustable seat 400 illustrated in FIGS. 7 and 8 is configured to allow a passenger 70 to sit facing a first direction 11A as shown in FIG. 7 and/or in a second direction 11B as shown in FIG. 8. In an embodiment, the first direction 11A may be towards a front 10A of the vehicle 10 as shown in FIG. 7 (i.e., forward facing) and the second direction 11B may be towards a rear 10B of the vehicle 10 as shown in FIG. 8 (i.e., rearward facing). It is understood that the embodiments are not limited to the first direction 11A being towards the front 10A of the vehicle 10 and the second direction 11B being towards the rear 10B of the vehicle 10, and thus the adjustable seat 200 may be adjusted to face any direction of the vehicle 10 including but not limited to lateral directions perpendicular to the front 10A and rear 10B and any direction therebetween. The adjustable seat 400 may include a first seat section 410, a second seat section 420, a third seat section 430, and a fourth seat section 440. It is understood that while four seat sections 410, 420, 430, 440 are illustrated, the embodiments disclosed herein may be applicable to more or less than four seat sections.

By utilizing the seating sections 410, 420, 430, 440, the adjustable seat 400 is configured to provide support to a lower leg portion 76 of the passenger 70, an upper leg portion 74 of the passenger 70, a torso portion 72B of the passenger 70, and a head portion 72A of the passenger 70, when the passenger 70 is sitting in a first direction 11A or a second direction 11B. The lower leg portion 76 of the passenger 70 may include the legs of the passenger 70 below the knees. The upper leg portion 74 of the passenger 70 may include the legs of the passenger 70 above the knees and below the waist. The torso portion 72B of the passenger 70 may include the torso of the passenger 70. The head portion 72A of the passenger 70 may include the head of the passenger 70.

As illustrated in FIGS. 7-8, the first seat section 410 is configured to support the lower leg portion 76 of the passenger 70 when the passenger 70 is sitting facing the first direction 11A or the second direction 11B. As illustrated in FIGS. 7-8, the second seat section 420 is configured to support the upper leg portion 74 of the passenger 70 when the passenger 70 is sifting facing the first direction 11A or the second direction 11B. As illustrated in FIGS. 7-8, the third seat section 430 is configured to support the torso portion 72B of the passenger 70 when the passenger 70 is sifting facing the first direction 11A or the second direction 11B. As illustrated in FIGS. 7-8, the fourth seat section 430 is configured to support the head portion 72A of the passenger 70 when the passenger 70 is sitting facing the first direction 11A or the second direction 11B.

The adjustable seat 400 may also include a first support structure 449 having a first support arm 450, a second support structure 459 having a second support arm 460, and a lower base plate 470. The first support arm 450 operably connects the second seat section 420 to the lower base plate 470. The first support arm 450 may be configured to extend and retract to adjust the position (e.g., orientation) of the second seat section 420. The second support arm 460 operably connects the third seat section 430 to the lower base plate 470. The second support arm 460 may be configured to extend and retract to adjust the position (e.g., orientation) of the third seat section 430. In an embodiment, the first support arm 450 and the second support arm 460 may include actuators and/or servos.

The adjustable seat 400 may also include a first biasing mechanism 482 and a second biasing mechanism 484. The first biasing mechanism 482 may be interposed between the lower base plate 470 and a forward vehicle structure 483. In embodiment, the first biasing mechanism 482 may operate in at least one of tension and compression. In an embodiment, the first biasing mechanism 482 may be an energy absorbing mechanism. The second biasing mechanism 484 may be interposed between the lower base plate 470 and a rear vehicle structure 485. In embodiment, the second biasing mechanism 484 may operate in at least one of tension and compression. In an embodiment the second biasing mechanism 484 may be an energy absorbing mechanism. The lower base plate 470 may free to move towards the front 10A of the vehicle 10 and at least one of the first biasing mechanism 482 and the second biasing mechanism 484 may be configured to reduce acceleration of the lower base plate 470 towards the front 10A of the vehicle 10. The lower base plate 470 may free to move towards the rear 10B of the vehicle 10 and at least one of the first biasing mechanism 482 and the second biasing mechanism 484 may be configured to reduce acceleration of the lower base plate 470 towards the rear 10B of the vehicle 10. The lower base plate 470 may be attached to the vehicle 10 such that the lower base plate 470 may be allow to rotate and/or slide without being lifted off of the vehicle 10, such as, for example utilizing a track.

The lower base plate 470 is configured to rotate about a vertical axis Z1. The first seat section 410, the second seat section 420, the third seat section 430 and the fourth seat section 440 rotate with the lower base plate 70 about the vertical axis Z1. The lower base plate 470 may be secured to a structure of the vehicle 10 with the adjustable seat 400 facing the first direction 11A or the second direction 11B. The adjustable seat 400 also includes a reversible restraint system 500 that is secured to the lower base plate 470. The reversible restraint system 500 is located on the lower base plate 470 and is secured to the vehicle 10 through the lower base plate 470.

The reversible restraint system 500 includes a seat belt 530 that routes from a seat belt retractor 542 to the upper D-ring 510 to the latch plate 520 to the lower anchor 543. The reversible restraint system 500 includes an upper D-ring 510 that may be secured to either the third seat section 430 or the fourth seat section 440 on a second side 552 opposite a first side 550. The reversible restraint system 500 includes a seat belt 530 that is operably connected to the upper D-ring 510 of the reversible restraint system 500. The seat belt 530 may be operably connected to the upper D-ring 510 by threading the seat belt 530 through the upper D-ring 510. The seat belt 530 includes a latch plate 520 that may secure to a buckle 522 located on the first side 550 of the adjustable seat 400 or the lower base plate 470. The lower anchor 543 is located on the second side 552 and may be attached to the adjustable seat 400, the lower base plate 470 or to a structural support. Located proximate a second side 552 of the adjustable seat 400 opposite the first side 550, the seat belt 530 is directed through the upper D-ring 510 and then into a seat belt retractor 542. The seat belt retractor 542 is operably connected to the seat belt 530 and configured to retract the seat belt 530 as required. The upper D-ring 510 may be located on the second side 552 of the adjustable seat 400. The seat belt retractor 542 may be secured to the lower base plate 470. Note, as an alternative embodiment, the lower anchor 543 may be replaced with a second seat belt retractor and the latch plate 520 could be physically attached to the seat belt webbing so it cannot slide along the webbing length.

Figure 9:
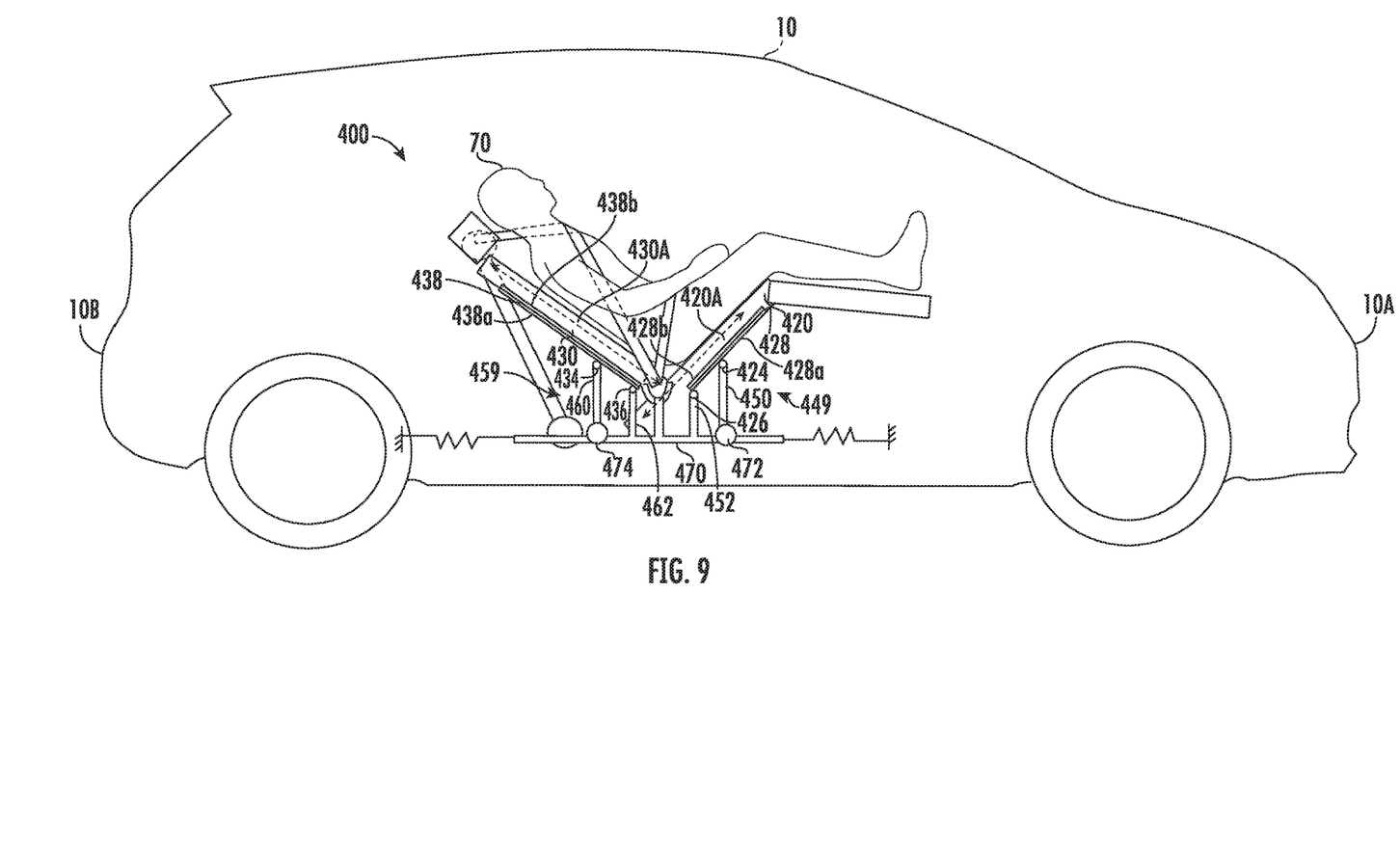
FIG. 9 is a side view of the adjustable seat having seat tracks, according to an embodiment of the present disclosure.

Referring to FIG. 9, with continued reference to FIGS. 7-8, a side view of an adjustable seat 400 for the vehicle 10 is illustrated, according to an embodiment of the present disclosure. As shown in FIG. 9, the adjustable seat 400 may include a first support structure 449 having multiple hinges 424, 426, 472, a first support arm 450, a first structural support 452, a seat track assembly 428, a second support structure 450 having multiple hinges 434, 436, 474, a second support arm 460, a second structural support 462, and a seat track assembly 438 to aid in the adjustment of the adjustable seat 400. The second seat section 420 may include a seat track assembly 428 operably connected to the second seat section 420. The seat track assembly 428 includes a translation portion 428b that is securely attached to the second seat section 420 and a base portion 428a operably connected to the translation portion 428b. The translation portion 428b is configured to linearly translate relative to the base portion 428a. The translation portion 428b can move the second seat section 420 (or a seat comfort surface of the second seat section 420) relative to the base portion 428a via a motor or a manual system similar to a powered or manual seat adjuster on a conventional vehicle that allows fore-aft seat translation. The first support arm 450 may be operably connected to the second seat section 420 through the seat track assembly 428. The first support arm 450 may be operably connected to the seat track assembly 428 through a hinge 424, which is operably connected to the base portion 428a. The hinge 424 may be operably connected to the base portion 428a of the seat track assembly 428, such that the base portion 428a may rotate relative to the hinge 424 but not linearly translate relative to the hinge 424. The adjustable seat 400 may also include a first structural support 452 that may be operably connected to the base portion 438a through a hinge 426.

The hinge 426 may be operably connected to the base portion 428a, such that the seat track assembly 428 may rotate relative to the hinge 426. A first structural support 452 connects the hinge 426 to the lower base plate 470. The structural support 452 provides structural support to the adjustable seat 400. The first structural support 452 provides structural support to the adjustable seat 400. The second seat section 420 may linearly translate along a seat axis 420A in FIG. 9. The first support arm 450 may be operably connected to the lower base plate 470 through a hinge 472, such that the first support arm 450 may rotate relative to the lower base plate 470 around hinge 472 but the hinge 472 does not linearly translate relative to the lower base plate 470. To change the angle $\beta1$ between the second seat section 420 and the third seat section 430, at least one of the first support arm 450 and the first structural support 452 may be configured to extend or retract, similar to a slider joint like on conventional fore-aft seat track that can be moved and locked into place via motorized power or a manual process.

The third seat section 430 may include a seat track assembly 438 operably connected to the third seat section 430. The seat track assembly 438 includes a translation portion 438b that is securely attached to the third seat section 430 and a base portion 438a operably connected to the translation portion 438b. The translation portion 438b is configured to linearly translate relative to the base portion 438a. The translation portion 438b can move the third seat section 430 (or a seat comfort surface of the third seat section 430) relative to the base portion 438a via a motor or a manual system similar to a powered or manual seat adjuster on a conventional vehicle that allows fore-aft seat translation. The second support arm 460 may be operably connected to the third seat section 430 through the seat track assembly 438. The second support arm 460 may be operably connected to the base portion 438a through a hinge 434, which is operably connected to the base portion 238a. The hinge 434 may be operably connected to the base portion 338a, such that the base portion 438a may rotate relative to the hinge 434 but not linearly translate relative to the hinge 434. The adjustable seat 400 may also include a second structural support 462 that may be operably connected to the base portion 238a through a hinge 436.

The hinge 436 may be operably connected to the base portion 438a, such that the seat track assembly 438 may rotate relative to the hinge 436. The second structural support 462 connects the hinge 436 to the lower base plate 470. The second structural support 462 provides structural support to the adjustable seat 400. The third seat section 430 may linearly translate along a seat axis 430A, as shown in FIG. 9. The second support arm 460 may be operably connected to the lower base plate 470 through a hinge 474, such that the second support arm 460 may rotate relative to the lower base plate 470 around hinge 474 but the hinge 474 does not linearly translate relative to the lower base plate 470. To change the angle β1 between the third seat section 430 and the section seat section 420, at least one of the second support arm 460 and the second structural support 462 may be configured to extend or retract, similar to a slider joint like on conventional fore-aft seat track assembly that can be moved and locked into place via motorized power or a manual process.

In another embodiment, the locations of the first support arm 450 and the first structural support 452 may be reversed, such that the first support arm 450 is nearer a center of the adjustable seat 400 and the first structural support 452 is nearer an outer portion of the adjustable seat 400. As yet another embodiment, the locations of the second support arm 460 and the second structural support 462 may be reversed, such that the second support arm 460 is nearer the center of the adjustable seat 400 and the second structural support 462 is nearer the outer portion of the adjustable seat 400.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to die teachings of the disclosure without departing from the essential scope thereof. Therefore, it is intended that the present disclosure not be limited to the particular embodiments disclosed, but will include all embodiments falling within the scope thereof.

What is claimed is:

1. An adjustable seat for a vehicle configured to allow a passenger to sit facing a first direction and facing a second direction, the adjustable seat comprising:
    a first seat section configured to support a lower leg portion of the passenger when the passenger is sitting facing the first direction;
    a second seat section configured to support an upper leg portion of the passenger when the passenger is sitting facing the first direction and a torso and head portion of the passenger when the passenger is sitting facing the second direction;
    a third seat section configured to support the torso and head portion of the passenger when the passenger is sitting facing the first direction and the upper leg portion of the passenger when the passenger is sitting facing the second direction; and
    a fourth seat section configured to support the lower leg portion of the passenger when the passenger is sitting facing the second direction.

2. The adjustable seat of claim 1, wherein the second seat section further comprises:
    an outer surface; and
    one or more bladders configured to inflate and adjust the outer surface to conform to the upper leg portion of the passenger when the passenger is sitting facing the first direction or to the torso and head portion of the passenger when the passenger is sitting facing the second direction.

3. The adjustable seat of claim 1, wherein the third seat section further comprises:
    an outer surface; and
    one or more bladders configured to inflate and adjust the outer surface to conform to the torso and head portion of the passenger when the passenger is sitting facing the first direction or to the upper leg portion of the passenger when the passenger is sitting facing the second direction.

4. The adjustable seat of claim 1, wherein the fourth seat section does not support the passenger when the passenger is sitting facing the first direction.

5. The adjustable seat of claim 1, wherein the first seat section does not support the passenger when the passenger is sitting facing the second direction.

6. The adjustable seat of claim 1, further comprising a hinge operably connected to the first seat section, wherein the first seat section may be rotated relative to the second seat section through an angle as measured between the first seat section and the second seat section.

7. The adjustable seat of claim 1, further comprising a hinge operably connected to the fourth seat section, wherein the fourth seat section may be rotated relative to the third seat section through an angle as measured between the fourth seat section and the third seat section.

8. The adjustable seat of claim 1, further comprising:
    a lower base plate;
    a first support structure operably connected to the second seat section and the lower base plate, the first support structure being configured to adjust a position of the second seat section; and
    a second support structure operably connected to the third seat section and the lower base plate, the second support structure being configured to adjust a position of the third seat section.

9. The adjustable seat of claim 8, wherein the first support structure comprises at least one of a first support arm and a first structural support, and wherein the at least one of the first support arm and the first structural support is configured to extend and retract to adjust the position of the second seat section.

10. The adjustable seat of claim 8, wherein the second support structure comprises at least one of a second support arm and a second structural support, wherein the at least one of the second support arm and the second structural support is configured to extend and retract to adjust the position of the third seat section.

11. The adjustable seat of claim 8, wherein the first support structure and the second support structure are configured to adjust an angle between the second seat section and the third seat section.

12. The adjustable seat of claim 8, wherein the lower base plate is free to move towards at least one of the first direction and the second direction, and wherein the adjustable seat further comprises at least one biasing mechanism operably connected to the lower base plate, the at least one biasing mechanism being configured to reduce acceleration of the lower base plate towards at least one of the first direction and the second direction.

13. The adjustable seat of claim 8, further comprising:
   a seat track assembly comprising a translation portion securely attached to the second seat section and a base portion operably connected to the translation portion, such that the translation portion is configured to linearly translate relative to the base portion; and
   a hinge operably connected to the base portion, such that the base portion may rotate relative to the hinge but not linearly translate relative to the hinge.

14. The adjustable seat of claim 8, further comprising:
   a seat track assembly comprising a translation portion securely attached to the third seat section and a base portion operably connected to the translation portion, such that the translation portion is configured to linearly translate relative to the base portion; and
   a hinge operably connected to the base portion such that the base portion may rotate relative to the hinge but not linearly translate relative to the hinge.

15. The adjustable seat of claim 8, wherein the first support structure comprises a first support arm and the adjustable seat further comprises:
   a hinge operably connecting the first support arm to the lower base plate, such that the first support arm may rotate relative to the lower base plate around the hinge but the hinge does not linearly translate relative to the lower base plate.

16. The adjustable seat of claim 8, wherein the second support structure comprises a second support arm and the adjustable seat further comprises:
   a hinge operably connecting the second support arm to the lower base plate, such that the second support arm may rotate relative to the lower base plate around the hinge but the hinge does not linearly translate relative to the lower base plate.

17. The adjustable seat of claim 1, further comprising:
   a reversible restraint system configured to secure the passenger in the adjustable seat when the passenger is sitting facing the first direction and secure the passenger in the adjustable seat when the passenger is sitting facing the second direction, the reversible restraint system comprising:
   a seat belt;
   a first D-ring anchor zone;
   a second D-ring anchor zone located opposite the first D-ring anchor zone; and
   an upper D-ring configured to secure to at least one of the first D-ring anchor zone and the second D-ring anchor zone, the seat belt being operably connected to the upper D-ring.

18. The adjustable seat of claim 17, further comprising:
   a D-ring track connecting the first D-ring anchor zone and the second D-ring anchor zone, wherein the upper D-ring is configured to move along the D-ring track between the first D-ring anchor zone and the second D-ring anchor zone.

19. The adjustable seat of claim 17, wherein the upper D-ring is configured to secure within the second D-ring anchor zone when the passenger is sitting facing the first direction, and wherein the upper D-ring is configured to secure within the first D-ring anchor zone when the passenger is sitting facing the second direction.

* * * * *